United States Patent [19]

Howard et al.

[11] 4,162,027
[45] Jul. 24, 1979

[54] REMOTE READOUT DEVICE FOR A PUMP

[75] Inventors: Warren L. Howard, Mansfield; Eugene E. Dorcas, Colleyville, both of Tex.

[73] Assignee: Datacon, Inc., Arlington, Tex.

[21] Appl. No.: 871,812

[22] Filed: Jan. 24, 1978

[51] Int. Cl.² ............................................. B67D 5/04
[52] U.S. Cl. ........................................ 222/23; 222/76
[58] Field of Search .......................... 222/23, 25-28, 222/40, 71, 76

[56] References Cited
U.S. PATENT DOCUMENTS

| 2,510,093 | 6/1950 | Ferguson et al. | 222/26 X |
| 3,053,414 | 9/1962 | Rapisarda | 222/28 X |
| 3,084,832 | 4/1963 | Rapisarda | 222/28 |
| 3,236,415 | 2/1966 | Parker | 222/25 |
| 3,469,078 | 9/1969 | Binford | 222/25 X |
| 3,751,642 | 8/1973 | Todd et al. | 222/23 X |
| 3,927,800 | 12/1975 | Zinsmeyer et al. | 222/26 |

Primary Examiner—Joseph J. Rolla
Attorney, Agent, or Firm—James E. Bradley

[57] ABSTRACT

An improved device for relaying information, such as quantity transferred, from inside the explosive environment of a flammable liquids pump to a remote location. A mechanical record of the information is converted to electrical pulses by light emitting diode and light sensitive transistor. A barrier, through which the pulses are transferred out of the explosive environment, contains resistors which prevent an explosive spark.

8 Claims, 4 Drawing Figures

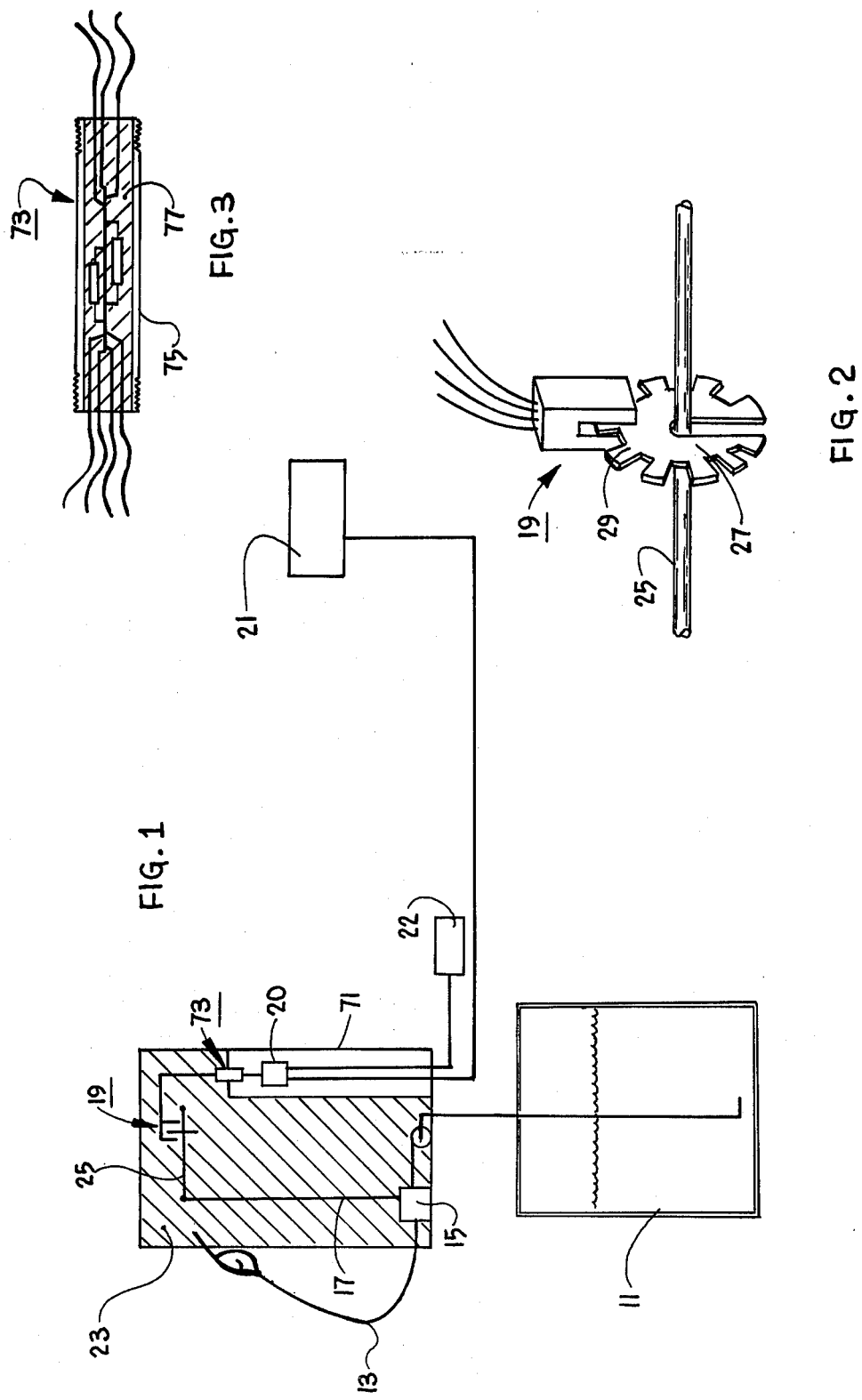

REMOTE READOUT DEVICE FOR A PUMP

BACKGROUND OF THE INVENTION

1. Field of the Invention

This invention relates, in general, to pumping devices and more particularly to pumping devices with electrical relay means for relaying information from within an explosive environment to a remote location.

2. Description of the Prior Art.

In a pumping device for pumping flammable liquids it is often necessary to provide a relay means to a remote location. This relay means transfers information such as the quantity of liquid that has been pumped. One example of this type of device is found in a gasoline service station. Here, a gasoline pump located in an open parking area transfers gasoline to vehicles. However, it is often desired or necessary that the information as to the quantity of gasoline pumped be relayed to a building where an attendant can record it and collect the proper fee. One of the most efficient means for transferring this information is by an electrical wire. The problem with this electrical means of transferring the information is the explosive environment around the pumping device.

Inside the gasoline pump housing, gasoline fumes can accumulate creating an explosive environment. All electrical devices within the explosive environment must, therefore, be explosion proof. One way to make electrical devices explosion proof is to adequately insulate them from the explosive environment. Thus, the main electrical supply to the pump is contained in an electrical make-up box which is insulated to keep out the explosive fumes.

Prior to this invention, electrical means for relaying the information as to how much gasoline had been pumped were made explosion proof by insulation. A magnet was connected to a shaft which rotated according to the quantity of gasoline being pumped. A glass container with wires sealed inside sensed the rotating magnet. This sensing was accomplished by two closely spaced bare wires which were brought into contact as the magnet passed closely by. The pulse produced was relayed to a remote location. To operate, this device required a high current. Therefore, all of the connections and wires were specially protected to prevent a short circuit and an explosive spark. This type of device, while performing adequately, is subject to improvement.

It is accordingly an object of the present invention to provide a safer and less expensive relay means.

BRIEF DESCRIPTION OF THE DRAWINGS

FIG. 1 is a schematic side view showing a pumping device with relay means in accordance with a preferred embodiment of the invention.

FIG. 2 is a perspective view of the sensing means of the pumping device of FIG. 1.

FIG. 3 is a schematic side view of the container means of the pumping device of FIG. 1.

DESCRIPTION OF PREFERRED EMBODIMENT

Figure 4:
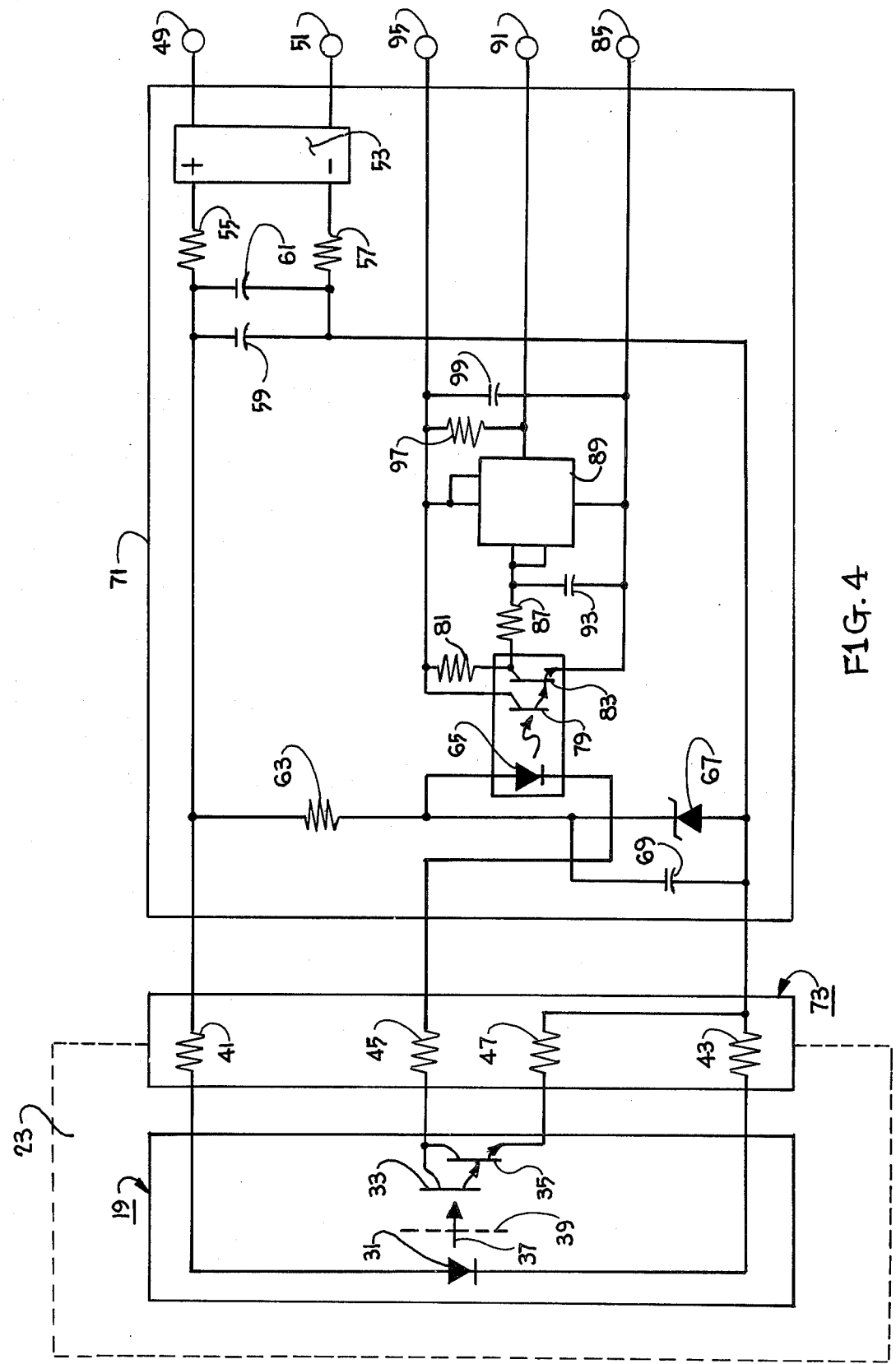
FIG. 4 is a schematic circuit diagram of the relay means of the pumping device of FIG. 1.

Referring now to the drawings a schematic of the present invention is shown at FIG. 1. The overall purpose of the device is to pump a flammable liquid, measure the quantity of liquid transferred, and electrically relay from the pump to a remote location the information as to the quantity of liquid transferred. The device shown in FIG. 1 is a type commonly found in service stations where gasoline is pumped from a tank 11, through a hose 13 to a vehicle (not shown). As the gasoline is pumped it is measured through pistons 15 which record the quantity of gasoline transferred by rotating a shaft 17. By appropriate gears, the shaft 17 then rotates other shafts which hold cylinders. These cylinders numerically show through windows the quantity of gasoline pumped and the total price which is to be paid for that quantity of gasoline. An electronic sensor 19 records the turning shaft as a series of pulses. Each of these pulses corresponds to a certain quantity of gasoline having been transferred. These pulses are then relayed through a circuit 20 to a remote location 21, such as a building where an attendant stays. Power is supplied by a 120 volt power supply 22. At the remote location 21, the pulses are counted and the total is recorded or displayed on a readout of some kind. The improvement of this invention concerns the sensing and relaying of the volume flow information. These portions of the pumping device are described below in more detail.

The sensing device 19 is located in an explosive environment 23. The explosive environment 23 is so designated since fumes from the gasoline can escape and fill this area. A spark within this area could ignite the fumes and causes an explosion. For this reason any electrical devices within the explosive environment must not be able to produce a spark or else be insulated from the explosive fumes by a suitable container. This spark prevention must be maintained even for the situation in which the electrical device is installed incorrectly since the chance of improper installation is fairly high.

In FIG. 1, the explosive environment 23 is shown by the cross-hatched area; and in FIG. 4 by a dotted line. The shaft 17 and the other shafts and cylinders are within the explosive environment 23. Shaft 25 is one of the shafts which rotates according to the quantity of gasoline transferred. Referring now to FIG. 2, shaft 25 is shown with a cylindrical disc 27 attached. Disc 27 is attached to the shaft 25 such that shaft 25 coincides with the cylindrical axis of the disc. Disc 27 has regular indentations in its periphery such that teeth, such as 29, are formed. As the shaft 25 and disc 27 rotate each of the teeth, such as 29, pass through a sensor 19 which records their passage with an electrical pulse. Since the teeth rotate uniformly with respect to the quantity of gasoline being pumped, each pulse corresponds to a certain quantity of gasoline having been pumped.

Referring now to FIG. 4, the sensor 19 is made up of two parts; a photo-emitter and a photo-receptor. The photo-emitter is a light emitting diode 31. The photo-receptor is made up of two transistors 33, 35 arranged in a circuit commonly known as a darlington pair. Transistor 33 is light sensitive and is responsive to the light from diode 31. The path of the light from diode 31 to transistor 33 is indicated by the arrow 37. The position of the disc 27 relative to the sensor 19 is shown by the dotted line 39. Thus as the teeth, such as 29, rotate, they intermittently block the emission pathway from diode 31 to transistor 33. This intermittent blocking of the light from the photo-emitter produces pulses which are received and amplified by the photo-receptor.

A pair of resistors 41 and 43 are connected to diode 31. The left lead of resistor 41 is connected to the input of diode 31 and the left lead of resistor 43 is connected to the output of diode 31.

A pair of resistors 45 and 47 are connected to the photo-receptor. The left lead of resistor 45 is connected to the input of the photo-receptor. Here, the input of the phot-receptor is the collector of transistor 35. The left lead of resistor 47 is connected to the output of the photo-receptor. Here, the output of the photo-receptor is the emitter of transistor 35.

Each of the resistors 41, 43, 45 and 47 has sufficient resistance to prevent a spark in the explosive environment. Thus, if any voltage supply which can be found in this type of pumping device is connected in any manner to the right lead of resistor 41, 43, 45 or 47 no spark will occur at the left lead of the resistor regardless of how they are connected or grounded. The highest voltages which can be found in this type of pumping device are 265 volts alternating current and 375 volts direct current. Herein these voltages of 265 volts alternating current and 375 volts direct current will be referred to as a high potential. A resistance of 10,000 ohms for each of the resistors 41, 43, 45 and 47 has been found suitable to prevent a spark for these voltages.

A power supply provides power to the photo-emitter. A 120 volt alternating current is supplied across the terminals 49 and 51. A bridge rectifier 53, resistors 55 and 57, and capacitors 59 and 61, convert this alternating current to a 150 volt direct current. Terminals 49 and 51 are connected to the inputs of the bridge rectifier 53. Resistor 55 is a 1,000 ohm resistor whose right lead is connected to the positive output of the bridge rectifier 53. Resistor 57 is a 1,000 ohm resistor whose right lead is connected to the negative output of the bridge rectifier. Capacitors 59 and 61 are 8 microfarad and 0.01 microfarad capacitors and are connected in parallel across the left leads of resistors 55 and 57. The left lead of resistor 55 is connected to the right lead of resistor 41. The left lead of resistor 57 is connected to the right lead of resistor 43. Thus, a 150 volt direct current potential difference is supplied across the right leads of resistors 41 and 43.

The power supply for the photo-emitter also supplies power to the photo-receptor. Resistor 63 is a 47,000 ohm resistor with one lead connected to the right lead of resistor 41 and the other lead connected to the input of a diode 65. The output of diode 65 is connected to the right lead of resistor 45. The right lead of resistor 47 is connected to the right lead of resistor 43. A Zener diode 67 provides a regulated 9.1 volts. The anode of the Zener diode 67 is connected to the right lead of resistor 47 and the cathode is connected to the input of diode 65. A 0.1 microfarad capacitor 69 is connected from the right lead of resistor 47 to the input of diode 65. Thus, a steady potential is supplied across the right leads of resistors 45 and 47.

The power supply described above and the connections between the power supply and the resistors 41, 43, 45 and 47 are all contained in an electrical make-up box 71. This box 71 isolates the components contained in it from the explosive environment. Therefore, the high potential connections are not exposed to the explosive environment.

While the potential across the right leads of resistors 41 and 43 was described as 150 volts direct current, direct current voltages in the range of 112 to 170 volts may be acceptable. In addition, direct current voltages in the range of 7 to 12 volts may be acceptable across the right leads of resistors 45 and 47.

The resistors 41, 43, 45 and 47 are all sealed in a container 73. This container 73 seals the high potential connections to the resistors 41, 43, 45 and 47 outside of the explosive environment 23 and prevents an improper installation which could cause an explosion. Referring now to FIG. 3, container 73 is comprised of a threaded steel pipe 75 filled with an epoxy sealer 77. A preferred type of epoxy 77 is manufactured by Furane Plastics and is composed of Epocast 1835 with hardener 9816. The resistors 41, 43, 45 and 47 are all completely contained within the container 73 such that only their leads extend out of the container 73. The right end of container 73 is screwed, by its threads, into the electrical make-up box 71 such that the leads to the power supply extend into the box 71 and the leads to the sensor 19 extend into the explosive environment. A metal cap may be screwed onto the left end of the container 73 to further protect the contents. By sealing the resistors in the container 73 an improper connection of the power supply is not possible which will produce a spark in the explosive environment. Each possible connection from inside the electrical make-up box to the explosive environment must pass through a 10,000 ohm resistor which is sufficient to prevent a spark from occurring.

Due to the high resistance provided by the resistors 41, 43, 45 and 47, the light emitting diode 31 and the light sensitive transistor 33 must operate on a low current; in the range of 0.3 to 9.4 milliamps. OP160 manufactured by Optron, Inc. or TIL32 manufactured by Texas Instruments, Inc. have been found to be suitable light emitting diodes. OP830 manufactured by Optron, Inc. has been found to be a suitable light sensitive transistor in a darlington pair. Both of these components can operate on a low current. In addition, both of these components operate in the infrared spectrum which is an advantage where dirt and film can hinder transmission in the visual spectrum.

As mentioned above, a diode 65 is present in the power supply to the photo-receptor. This diode 65 is a light emitting diode and is part of a photo-coupler which senses the pulses produced by the photo-receptor. These sensed pulses are amplified and transmitted to a remote location. The pulses produced by the light emitting diode 65 are received by a light sensitive transistor 79. A 3,300 ohm resistor 81 has one lead conneced to the collector of transistor 79 and the other lead connected to the collector of a transistor 83. The emitter of transistor 79 is connected to the base of transistor 83. The emitter of transistor 83 is connected to a terminal 85. The collector of transistor 83 is also connected to the left lead of resistor 87. Resistor 87 has a resistance of 47,000 ohms and has its right lead connected to a circuit 89 known as a Schmitt trigger. The Schmitt trigger circuit is well known in the art and an example can be found on page 89 of *Basic Collected Circuits*, by D. I. P. Stretton and A. W. Hartley. The Schmitt trigger circuit produces a strong square wave from a non-rectangular input. The Schmitt trigger circuit 89 is also connected to the collector of transistor 79 and the emitter of transistor 83. The square wave output of the Schmitt trigger circuit is along a line which connects to terminal 91. A 0.01 microfarad capacitor 93 is connected from the right lead of resistor 87 to terminal 85. Terminal 95 is connected to the collector of transistor 79. A resistor 97 with a resistance of 1,000 ohms is connected from terminal 95 to terminal 91. A capacitor 99 with a capacitance of 0.1 microfarads is connected from terminal 95 to terminal 85.

The photo-coupler and all of the components associated with the Schmitt trigger 89 are all housed in the electrical make-up box 71. In addition, the Schmitt trigger 89 is powered by a separate power supply. Terminal 95 is connected to a 5 volt direct current power supply and terminal 85 is connected to a direct current ground. Terminal 91 is connected to the readout at the remote location 21.

Together, the above circuits operate as follows. Sensor 19 forms pulses due to the rotating disc 39. These pulses are relayed by the photo-coupler to the Schmitt trigger circuit 89. This circuit squares the pulses, strengthens them, and then transmits them to the remote location 21. There, the pulses can be converted on an appropriate readout.

From the foregoing it can be seen that this invention solves the problem of the explosive environment in a new way. The low current supplied through the resistors 41, 43, 45 and 47 is not capable of producing a spark. Therefore, the wires and connections to the sensor 19 need not be specially protected. In addition, the container 73 produces a barrier between the explosive environment and the high potential connections which prevents an installation which could cause a spark. Thus, a safer and less expensive relay means is provided. Finally, the photo-emitter and photoreceptor supply a reliable pulse current even in the electronically noisy environment of a service station.

The foregoing disclosure and the showings made in the drawings are merely illustrative of the principles of this invention and are not to be interpreted in a limiting sense.

What is claimed is:

1. In a pumping device for pumping flammable liquids, measuring the quantity of liquid transferred, and electrically relaying from within the explosive environment of the pumping device to a remote location information as to the quantity of liquid transferred, the improvement which comprises:
   a. a photo-emitter disposed within the explosive environment of the pumping device;
   b. a photo-receptor disposed within the explosive environment in an orientation such that the emission from said photo-emitter is receivable by said photo-receptor;
   c. a blocking means for intermittently blocking the emission pathway between said photo-emitter and said photo-receptor, said blocking means being connected to mechanical parts of the pumping device such that each blockage of the emission pathway corresponds to a certain quantity of liquid having been pumped;
   d. a first pair of resistors, the left lead of one connected to the input of said photo-emitter and the left lead of the other connected to the output of said photo-emitter; each of said resistors having sufficient resistance to prevent a spark from occurring when a high potential is applied to the right lead of each resistor and the left leads are short circuited or grounded;
   e. a second pair of resistors, the left lead of one connected to the input of said photo-receptor and the left lead of the other connected to the output of said photo-receptor; each of said second pair of resistors having sufficient resistance to prevent a spark from occurring when a high potential is applied to the right lead of each resistor and the left leads are short circuited or grounded;
   f. a first power means for supplying a potential difference across the right leads of said first pair of resistors; said first power means being disposed outside of the explosive environment;
   g. a second power means for supplying a potential difference across the right leads of said second pair of resistors; said second power means being disposed outside of the explosive environment;
   h. container means for sealingly containing said first pair of resistors and said second pair of resistors; said container means being disposed across the periphery of the explosive environment such that the left leads of said first pair of resistors and said second pair of resistors extend from said container means into the explosive environment, and the right leads of said first pair of resistors and said second pair of resistors extend from said container means outside of the explosive environment; and
   i. means for transferring the pulses produced by said photo-receptor to the remote location, said transferring means being connected to the right leads of said second pair of resistors and disposed outside of the explosive environment of the pumping device.

2. The pumping device of claim 1 wherein said blocking means comprises a uniformly toothed disc which rotates in correspondence with the quantity of liquid having been pumped; said disc being disposed such that the teeth of said disc intermittently block the emission pathway between said photo-emitter and said photo-receptor as the disc rotates.

3. The pumping device of claim 1 wherein said transferring means comprises:
   a. a photo-coupler connected to said second power means such that each pulse of current across said photo-receptor is relayed by said photo-coupler; and
   b. a Schmitt trigger circuit connected to said photo-coupler for squaring the pulse waves relayed by said photo-coupler and amplifying the squared pulse to be sent to a remote location;
   c. a third power means for driving said Schmitt trigger circuit; and
   d. carrying means for carrying the squared pulse produced by said Schmitt trigger circuit to the remote location.

4. The pumping device of claim 1 wherein said photo-emitter comprises a light emitting diode.

5. The pumping device of claim 1 wherein said photo-receptor comprises:
   a. a light sensitive transistor; and
   b. a transistor connected to said light sensitive transistor to form a darlington pair.

6. The pumping device of claim 1 wherein said first power means supplies a direct current potential in the range of 112 to 170 volts.

7. The pumping device of claim 1 wherein said second power means supplies a direct current potential in the range of 7 to 12 volts.

8. In a service station gasoline pump assembly of the type having a housing and an electrical make-up box secured inside the housing which separates the electrical components from the explosive environment inside the housing, an improved means for transmitting to a remote location the quantity of gasoline dispensed, comprising:
   a. a photo-emitter disposed within the explosive environment;

b. a photo-receptor disposed within the explosive environment in an orientation such that the emission from said photo-emitter is receivable by said photo-receptor;
c. a blocking means for intermittently blocking the emission pathway between said photo-emitter and said photo-receptor, said blocking means being connected to mechanical parts of the gasoline pump assembly such that each blockage of the emission pathway corresponds to a certain quantity of gasoline having been pumped;
d. a first pair of resistors, the left lead of one connected to the input of said photo-emitter and the left lead of the other connected to the output of said photo-emitter; each of said resistors having sufficient resistance to prevent a spark from occurring when a high potential is applied to the right lead of each resistor and the left leads are short circuited or grounded;
e. a second pair of resistors, the left lead of one connected to the input of said photo-receptor and the left lead of the other connected to the output of said photo-receptor; each of said second pair of resistors having sufficient resistance to prevent a spark from occurring when a high potential is applied to the right lead of each resistor and the left leads are short circuited or grounded;
f. a first power means for supplying a potential difference across the right leads of said first pair of resistors; said first power means being disposed in the electrical make-up box;
g. a second power means for supplying a potential difference across the right leads of said second pair of resistors; said second power means being disposed in the electrical make-up box;
h. container means for sealingly containing said first pair of resistors and said second pair of resistors; said container means being sealingly connected to the electrical make-up box such that the left leads of said first pair of resistors and said second pair of resistors extend from said container means into the explosive environment, and the right leads of said first pair of resistors and said second pair of resistors extend from said container means into the electrical make-up box; and
i. transferring means for amplifying and squaring the pulses produced by said photo-receptor and transferring these pulses to the remote location, said transferring means being connected to the right leads of said second pair of resistors and disposed in the electrical make-up box.

* * * * *